June 13, 1939.                K. MARQUARDT                2,162,471
                              ELECTRIC CONDENSER
                             Filed Feb. 27, 1935
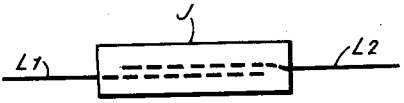
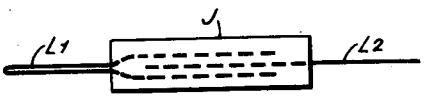
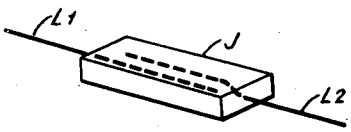
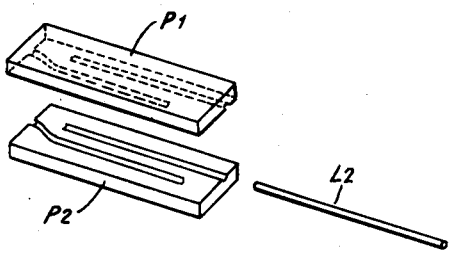
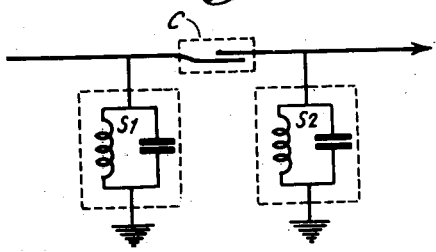
INVENTOR.
KURT MARQUARDT
BY
ATTORNEY.

Patented June 13, 1939

2,162,471

UNITED STATES PATENT OFFICE 2,162,471

ELECTRIC CONDENSER

Kurt Marquardt, Berlin-Siemensstadt, Germany, assignor to Siemens & Halske Aktiengesellschaft, Berlin-Siemensstadt, Germany, a corporation of Germany Application February 27, 1935, Serial No. 8,465
In Germany March 8, 1934

4 Claims. (Cl. 175—41)

This invention relates to a simplified and improved low-capacity condenser especially adapted for radio-frequency use.

The present invention is concerned with a condenser possessing very low capacity of the kind often used in radio-frequency work for the coupling of oscillation circuits in radio-frequency measuring arrangements. Condensers of the kind here concerned have a capacity of an order of magnitude of around 0.5 to 5 micro-microfarads.

The manufacture of such extremely small condensers has heretofore been attended with serious difficulties; more particularly speaking, it has been found to be difficult to make such tiny condensers in the form of the customary layer stack or rotary type. In frequent instances, especially in the coupling of radio broadcast receiver bandpass filters, low capacities of the kind here mentioned have been formed by having two insulated wires twisted around each other a short distance. However, a condenser of this kind is very unstable in its capacity for the reason that every change in the twist, strand or in the insulation, in fact, any and every shift or motion in the condenser structure led to a change in the capacity value. For this reason a condenser of this sort has been found to be unserviceable for use in radio receiving sets produced on a large scale, and more particularly for measuring bridge devices and the like.

Now the present invention discloses simple and inexpensive ways and means to create a fixed condenser of extremely low capacity in which the disadvantages above referred to are obviated, although its metallic coats or electrodes are also formed by wire ends or by similar metallic conductors. The desired end is attained by arranging the wire or conductor ends, in a preferably low-loss insulation material or dielectric, and keeping them in relative spaced position. The bare metallic conductors, for example, are held in a form and adjusted, and are then, when still in this form, surrounded by some suitable insulation material by pressing, casting, spraying or molding so that the conductors after such treatment are firmly embedded so that they constitute with the ensuing insulator body a firm condenser element or unit. The insulation material used therefor may consist, e. g., of glass into which the bare conductor ends are embedded by fusion. Very advantageous in this connection and use, however, are certain artificial materials made from hydrocarbons and known in the trade under the name of "Trolitul" whose chemical formula is $C_8H_8$ and is also known in commercial products by the terms "Styrol, Styrene, Cinnamol, Cinnamene, Styrolene, Vinylbenzene," inasmuch as these materials, in so far as well as the treatment of the material during manufacture (spray) as their puncture strength and mechanical properties are concerned exhibit very advantageous properties, while in addition they possess a very low dielectric constant. However, other kinds of artificial resins and Bakelites as well as paraffins could be used for the same purpose.

A number of exemplified embodiments of a condenser of the kind here disclosed are illustrated in the drawing in which, Fig. 1 is a plan view of a small condenser with two parallel arranged electrodes;

Fig. 2 is a plan view of a small condenser with three parallel arranged electrodes;

Fig. 3 is a perspective view of Fig. 1;

Fig. 4 is a perspective view showing a modification of Fig. 1; and

Fig. 5 is a circuit diagram of a simple bandpass filter showing the use of condensers of this invention.

Referring now in detail to the drawing,

Fig. 1 shows the disposition and securing of the metallic coats or electrodes which here consist of slender bare wires. What must be kept in mind in this connection is that in the insulation body J the wires $L_1$ and $L_2$ in so far as they are placed opposite each other, are positioned roughly parallel and at uniform distance from each other. The wire of one polarity, say, conductor $L_1$ is placed perfectly rectilinearly inside the insulator body so that, when heated, it is feasible to slightly extract the conductor in order to thus insure desired changes in the value of the capacitance. In lieu of the wire ends, here shown, as will be understood, also flat sheet strips or similar metallic conductors could be employed.

Fig. 2 shows another embodiment and form of the metallic conductors so arranged as to insure a slightly higher capacity. The conductor $L_1$ in this instance is bifurcated inside the insulator body or matrix J, this being accomplishable most simply by that a wire, as shown, is doubled back upon itself to result in a fork-like structure, the prongs thereof embracing between themselves the wire of the opposite polarity. Also in this disposition variation of the capacity is possible by shifting the wire $L_2$ upon heating or by suitable treatment of the material. It will be evident that a change in the capacity is obtainable also by choosing different guages of wire thus changing the cross-sectional area.

Fig. 3 shows a perspective view how the wires are arranged in such a condenser element of Fig. 1.

Fig. 4 shows in perspective another possible embodiment in which the metallic conductors of the condenser are held and secured between two insulation plates. The various elements are shown in this figure spaced apart merely for the purpose of more clearly indicating the proper relation of the elements. These insulator plates or slabs, for instance, could be subjected to uniform pressure by the aid of a clamping device in order that thus fixed positioning of the metallic conductors may be insurable; or else an adhesive or solvent substance could be used in order to interconnect the two insulator plates. Another mode of uniting the plates consists in that, with the use of certain materials, both insulation plates are brought together after assembling by heating. In order that in such cases the mutual spacing and securing of the metallic conductors may be properly insurable, it may be a good plan to impress or engrave position or datum marks in the insulation plates when the latter are made.

The drawing shows that a top plate P1 is firmly assembled with a bottom plate P2, with the wires being priorly placed into the position marks or recesses.

Fig. 5 shows a typical circuit diagram of a bandpass filter wherein the condenser C of this invention may be used for coupling two bandpass filters S1 and S2.

I claim:

1. An electric condenser having a small capacity comprising rigid metallic electrodes and two insulating plates, each plate having preformed indentations equal to one-half the cross-sectional area of said electrodes to retain said metallic electrodes in a predetermined spaced relationship.

2. An electric condenser having a small capacity comprising rigid metallic electrodes and two insulating slabs, each having preformed slots for said electrodes to retain said metallic electrodes in a predetermined spaced relationship, said slabs and said electrodes being bound together by adhesive material.

3. An electric condenser having a small capacity comprising rigid rod-like metallic electrodes and two insulating plates, each plate having preformed indentations equal to one half the cross-sectional area of said electrodes to retain said metallic electrodes in a predetermined spaced relationship.

4. An electric condenser having a small capacity comprising rigid metallic electrodes and two insulating plates, each plate having preformed indentations equal to one-half the cross-sectional area of said electrodes to retain said metallic electrodes in a predetermined spaced relationship, both of said insulating plates being bound together after assembling by heating.

KURT MARQUARDT.